United States Patent [19]

Levinson et al.

[11] 3,966,977

[45] June 29, 1976

[54] VEGETABLE PROTEIN PRODUCT AND PROCESS

[75] Inventors: Arthur A. Levinson, Chicago; Kenneth B. Basa, Evanston, both of Ill.

[73] Assignee: National Can Corporation, Chicago, Ill.

[22] Filed: Oct. 10, 1973

[21] Appl. No.: 405,201

Related U.S. Application Data

[63] Continuation-in-part of Ser. No. 60,764, Aug. 3, 1970.

[52] U.S. Cl. .............................. 426/331; 426/532; 426/802
[51] Int. Cl.² ...................... A23J 3/00; A23L 1/20; A23L 3/34
[58] Field of Search ........... 426/104, 148, 151, 205, 426/331, 377, 431, 532, 802

[56] References Cited
UNITED STATES PATENTS

| | | | |
|---|---|---|---|
| 3,485,636 | 12/1969 | Hoffman | 426/362 |
| 3,498,794 | 3/1970 | Calvert et al. | 426/364 |
| 3,620,755 | 11/1971 | Hoffman | 426/199 |

*Primary Examiner*—James R. Hoffman
*Attorney, Agent, or Firm*—Neuman, Williams, Anderson & Olson

[57] ABSTRACT

A process for producing a soybean and other vegetable protein based food product having an enhanced protein content and the texture and mouth feel of meat and other chewy foods which comprises contacting a compacted, defatted, vegetable protein containing seed meal material with water and a polyhydric alcohol having bacteriostatic properties at a pH ranging from about 2.0 to about 6.5 at elevated temperatures and superatmospheric pressures for a time sufficient to extract a substantial amount of the non-proteinaceous solubles and increase the protein content thereof while essentially maintaining the structural integrity of the starting material, recovering the product from the aqueous liquor and reducing the moisture content thereof to produce a porous product containing an amount of polyhydric alcohol sufficient to render it resistant to bacterial attack when packaged without sterilization or canning.

4 Claims, 2 Drawing Figures

VEGETABLE PROTEIN PRODUCT AND PROCESS

CROSS REFERENCE TO RELATED APPLICATIONS

This application is a Continuation-In-Part of our copending application, Ser. No. 60,764, filed Aug. 3, 1970.

BACKGROUND OF THE INVENTION

1. Field of the Invention

This invention relates to a process for producing a fibrous or meat-like food product by treatment of a vegetable protein containing seed meal material under controlled conditions of heat, pressure and pH.

2. Description of the Prior Art

The prior art disclosed that fibrous meat-like products are produced from soy protein by forming an alkaline solution of soy protein from a defatted, dehulled soybean meal or grit. The alkaline soy protein solution is then commonly extruded from spinnerettes into a coagulating bath containing salt and having a pH on the acid side. The fibers formed by this procedure are frequently accumulated into a tow and the tows combined to make a larger unit. The fibers in this tow are customarily oriented in the same direction to simulate the normal fiber and grain texture of meat. The tows may be impregnated with fats, spices, other proteins, flavors, etc. Frequently, they are then cooked and cut. One of the problems associated with the use of regenerated soy protein is that the use of strongly alkaline solutions in the process results in hydrolysis and loss of some protein and the final product is characterized by a lowered food protein efficiency ratio.

The prior art also discloses the treatment of soybean meal to remove odors by contacting a dehulled, defatted soybean meal with certain protonic acids, limited amounts of moisture (water), low temperatures and short periods of time. (See U.S. Pat. No. 3,361,574).

It is also known to produce soybean based food products which are essentially cellular or expanded in character. These products are obtained by a variety of processes which include as a principal step the heating of a soybean based dough containing moisture at elevated temperatures and pressures followed by the sudden release of pressure which permits trapped moisture in the product then under pressure, to expand and produce numerous elongated cells which are oriented in the product. The final product may be characterized as popped or exploded. (See Atkinson U.S. Pat. No. 3,488,770).

SUMMARY OF THE INVENTION

This invention relates to a process for producing a vegetable protein seed meal based food product having the texture and mouth feel of meat and being characterized as relatively free from off-tastes and odors which comprises contacting a compacted, defatted, vegetable protein containing seed meal product with water at a pH ranging from about 2.0 to about 6.5, at temperatures of above about 105°C. and at superatmospheric pressures, for a time sufficient to extract a substantial amount of essentially non-proteinaceous components and enhance the protein content of the starting material, recovering the thus treated product from the resulting aqueous liquor and reducing the moisture content of the product.

The starting materials used in this invention are compacted, defatted vegetable protein containing seed meal materials which have been subjected to mastication and extrusion under high pressures and temperatures above the boiling point of water. Such vegetable protein based seed meals, i.e., oil seed meals, include products such as soybean meal, cottonseed meal, sunflower seed meal and peanut meal, of which soybean meal is the most preferred. It is also preferred to use meals which have been defatted and dehulled. This compacting operation is customarily carried out by the use of high pressure extruder-plasticator machinery such as an Anderson machine, manufactured by the V. D. Anderson Company of Cleveland, or expellers such as manufactured by the Fujika Company, Limited, of Tokyo. These machines are used to compact and compress a soybean grit (defatted and dehulled). They commonly employ a screw compression chamber which subjects the grit to ever increasing pressure. Some of these machines are called expeller-expanders, but the expression "expander" is employed to designate only a partial release of pressure while still in the screw-compression chamber and does not produce cellularity to any appreciable degree. The pressures employed for compaction in these machines range from about 2,000 to 5,000 pounds per square inch and the temperatures (usually friction generated) are over 100°C. The most preferred procedure permits moisture in the defatted, dehulled soybean grit or meal (3 to 12 or 14%) to be converted to steam and thereby debitter the soy product and also toast the same. The preferred procedure for preparation of the starting material is set out in Levinson U.S. Pat. No. 2,162,729. A product of this type is sold under the trademark TEXTRASOY by H. B. Taylor Company, Chicago, Ill., a division of National Can Corporation.

When the starting material employed is a defatted, dehulled soybean meal it may be further characterized as a compacted, defatted soybean meal product having a density of about 1.36 to 1.40 grams per cubic centimeter and preferably from about 1.37 to 1.39 g./cc. This is contrasted with a normal density for a defatted soybean meal of from about 1.29 to 1.30 g./cc. The compacted soybean product after treatment by the process of the present invention has a density of from about 0.47 to about 0.7 g./cc. with an average of about 0.58 to 0.60 g./cc. The figures are bulk density values for the porous soybean product in chunk form.

In the most preferred form of this invention the starting material is in the form of chips or shards which may range from 4–10 mesh (U.S. Standard Sieve Series) to about ¼ to ½ inch in thickness and have length and width of from ½ to 2 or 3 inches. These chips or shards are characterized in the most preferred form as having a skin on one surface thereof produced by machine action and heat. The skin is a somewhat denser structure than the remainder of the piece and is believed to be slightly denatured. The process of the present invention while producing a swelling of the compacted soy (or other proteinaceous vegetable material) product in a direction essentially normal to the direction of the skin surface does not appreciably affect the skin portion or alter its dimensions. During processing the compacted starting material swells in the manner indicated from about 40 to 85 percent of its original height. The skin portion which maintains its tough chewy character after processing aids in holding the soy product together as a unified piece during further processing.

Even when the products of this invention are comminuted, the skin represents a certain proportion of the final comminuted product which has the tough fibrosity of meat and adds to the total impression of a fibrous, chewy ground meat product. The so-called skin portion represents a layer of usually no more than about 1/16 of an inch and 1/32 to 1/64 of an inch or less is more common. The thickness of this skin portion is, of course, dependent somewhat on the conditions of temperature and pressure employed in the compaction (extrusion) process.

The process, as indicated above, is carried out by contact of the compacted soy product with water under varying conditions of pH ranging from about 2.0 to about 6.5. Preferably, the pH will range from about 2.3 to about 6.5. It has been determined that at lower pH's the product produced is tougher and at the higher pH's in the acidic range the product is somewhat softer. At pH's in the alkaline range, excessive softness occurs together with the production of "off" odors and flavors due to the attack of the alkaline solution on the protein. These alkaline conditions should therefore be avoided. The most preferred range of pH is from about 2.5 to about 4.8.

The acids employed in the process of this invention are preferably those which are acceptable for processing in the food industry such as acetic, lactic, citric, hydrochloric, phosphoric or the like of which acetic is the most preferred. Of course, other acidifying agents which hydrolyze to produce acid conditions in water such as, for example, acid salts (i.e., $KH_2PO_4$), and which are acceptable for use in food processing may be employed in lieu of acid.

The volume of water employed in this process should be sufficient to result in a substantial softening of the starting material and extraction of non-proteinaceous solubles to enhance the protein content of the final dried product. Generally, water in volumes of about two parts water or more per part of the compacted proteinaceous seed meal material are operable and at least about 3 parts are preferred. From 2 to 5 parts water per part of starting material are preferred for normal operations.

The temperatures employed in this process range from about 105°C. to about 150°C., preferably from about 108°C. to about 130°C., and most preferably from about 108°C. to about 121°C.

The process is carried out under pressure and the pressures indicated are those of saturated steam. Generally, the pressures are from about 2.5 psig. to about 55 psig. (pounds per square inch guage), preferably from about 5 to about 25 psig. and most preferably from about 5 to about 15 psig.

The time of treatment varies from about 5 minutes to about 90 minutes, preferably from about 5 to about 45 minutes. The time of treatment is determined in part by the size of the piece, temperature and the pressures used. Generally the time required is inversely proportional to the temperature and pressure and directly proportional to the size of the piece. Thus, 4–10 mesh pieces at 2–15 psig. require about 5 minutes; pieces of ¼ × 1 × 1 inch require about 15 minutes; and pieces or chunks measuring ¼ × 2 × 2 or 3 inches require about 60 more minutes. Furthermore, it should be stated that the time and other conditions of treatment should be sufficient to enhance the protein content of the final product (on a dry weight basis) at least about 5 or preferably 10 percent more.

The product after treatment with water at elevated temperatures and pressures and at a given pH, is recovered from the liquor and drained and then may be reduced in moisture content. The product, if desired, may at this time be washed with water and/or other solvents such as alcohol or azeotropes to remove additional solubles prior to drying, although this is not required. Generally, a washing step is used where the volume of water employed in the process is not sufficiently large to extract all of the solubilized, essentially non-proteinaceous material (carbohydrate). The process of the present invention produces a product which, on a moisture-free basis, is reduced in toto to about 75 to 85 percent of the original weight.

The product, after washing and/or draining, may be reduced in moisture content by drying or equivalent procedure to from about 2 to 65 percent (by weight), preferably from 2 to 50 percent, depending on the desired character of the final material. A so-called dry product may range from about 2 to 14 percent moisture, preferably from 3 to 12 percent moisture. A product that is sold or used as a "moist" product has a moisture content of from 20 to 65 percent by weight, preferably 20 to 50 percent moisture.

The process of the present invention results in an extraction of solubles and a general swelling of the material to about twice or three times it original volume. There is no popping or production of cells by a rapid change in pressure. The product is, however, relatively porous and readily absorbs fluid and is also, by virtue of that characteristic, readily rehydratable when placed in water. This porosity imparted to the products by the instant process is especially important where the products are subsequently employed as a proteinaceous component (either in whole or in part) of food products for human or animal consumption (such as dog food) which are subsequently retorted or sterilized in canning procedures. The porosity imparted has been found sufficient to permit proper heat penetration in the product to insure sterility or pasturization of the products.

The products of the present invention in their dry state may be impregnated with a variety of other materials such as, for example, fats, hydrolyzed vegetable protein, autolyzed yeast, egg albumen, flavors, spice oils, protein solutions, amino acids, single cell proteins, vitamins or the like.

One of the characteristics of the dried products of the present invention, especially those derived from defatted, dehulled compacted soybean meal, is that when the dried product has been rehydrated, it has physical properties when eaten that closely resemble the texture and mouth feel of meat. The original fibrous material present in the soybean product is essentially preserved. Furthermore, it has been found that the protein efficiency ratio of the protein material in the final product is practically unchanged. As indicated above, protein from soybeans or other proteinaceous vegetable materials which have been treated under alkaline conditions, such as by regeneration, including protein fiber spinning procedures, are severely modified and in some cases substantially lost in the process so that the protein efficiency ratio is lowered.

It has also been determined that the products produced by the process of the present invention have a sharply reduced bacterial contaminant liability which in some instances results in a substantially sterile material.

These products may be employed alone or mixed with other artificial or natural protein materials such as, for example, pieces of meat, fish protein, single cell protein, hydrolyzed vegetable protein, gravies, sauces, etc. The products produced herein when used alone or combined with other materials may be put through normal can cooking, sterilization or pasteurization processes and have sufficient structural integrity so as not to cook apart or turn into a mush.

In one alternative embodiment of this invention, it has been found possible to produce a moist product which has resistance to decomposition from adventitious bacteria. Such a product may be obtained by incorporating a small amount of a non-toxic, edible polyhydroxy alcohol having bacteriostatic properties in the water used in the process of this invention. Such polyhydroxy alcohols include propylene glycol, glycerol and butylene glycol. They are usually employed in the water used in the process in varying amounts. In a moist product which contains from 20 to 50 percent moisture, for example, the materials would be present in ratios of about 50% dry soybean material, 40% water and 10% propylene glycol. This glycol-containing product could be used as a so-called moist or chunky type dog food. Dry products having the same beneficial bacteriostatic properties would have as a typical ratio 85% dry soy material, 12% water and 3% propylene glycol.

BRIEF DESCRIPTION OF THE DRAWING

Reference is made to the attached drawing wherein:

swelling is essentially normal to that skin surface with some lateral swelling or distortion apparent at the portions of the piece above the skin surface.

DESCRIPTION OF THE PREFERRED EMBODIMENTS

In the following examples set forth in the table a compacted soy product produced by processing defatted, dehulled soy grits in an Anderson machine (Textrasoy) was used as a starting material. In general, after treatment, the products increase from an initial protein content of about 55 percent in the compacted soy product (on a moisture free basis) to from about 58 to about 62 percent protein on the same basis. This represents a protein enhancement of at least 10 percent on a moisture-free basis (MFB). The processing took place in a heated autoclave. Except where otherwise indicated, the water used was 800 ml. The time was about 30 minutes at 15 psig. saturated steam pressure (a temperature of about 121°C.). The pH of the water employed is shown in the third column. It should be noted that the use of larger amounts of acetic acid in examples 2–6 results in lower pH's in the preferred range and the final product recovered has lower moisture on drying and a higher protein content both on a dry and moisture-free basis. After treatment, the product was permitted to remain in the autoclave until the pressure fell to zero (usually no more than 15 minutes). The product was then recovered from the liquor, drained, weighed and dried overnight in a 90°C. oven.

TABLE

| Example No. | Start Wt. (gr.) | Start pH | Drained Wt. of Product | Final pH | Dried Wt. of Product gr. | Per Cent of Start Wt. | Dried Product | | |
|---|---|---|---|---|---|---|---|---|---|
| | | | | | | | | Protein (%) | |
| | | | | | | | % H$_2$O | Dried | Moisture-Free Basis |
| 1 | 168 | 5.6 | 418 | 6.0 | 144 | 85.5 | 5.72 | 54.9 | 58.2 |
| 2 | 162 | 3.05 | 379 | 5.38 | 136 | 84.2 | 3.7 | 59.8 | 62.2 |
| 3 | 166 | 2.95 | 378 | 4.85 | 139 | 83.7 | 2.66 | 60.2 | 62.0 |
| 4 | 162 | 2.85 | 356 | 4.55 | 133 | 82.2 | 3.93 | 60.0 | 62.4 |
| 5 | 166 | 2.80 | 363 | 4.25 | 135 | 81.4 | 1.70 | 59.8 | 60.8 |
| 6 | 161 | 2.65 | 349 | 3.82 | 128 | 79.5 | 1.79 | 59.2 | 60.3 |

Figure 1:
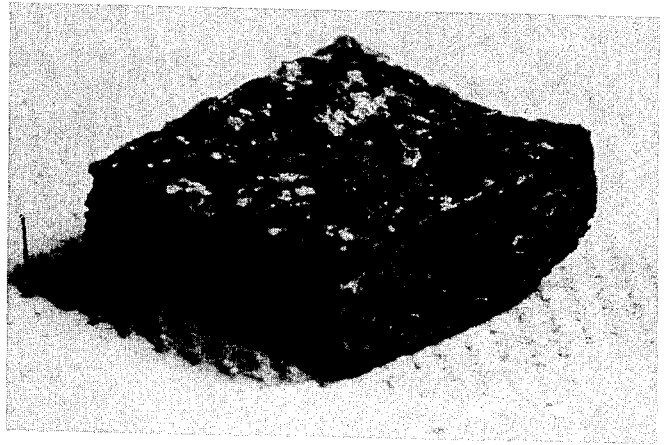
Figure 2:
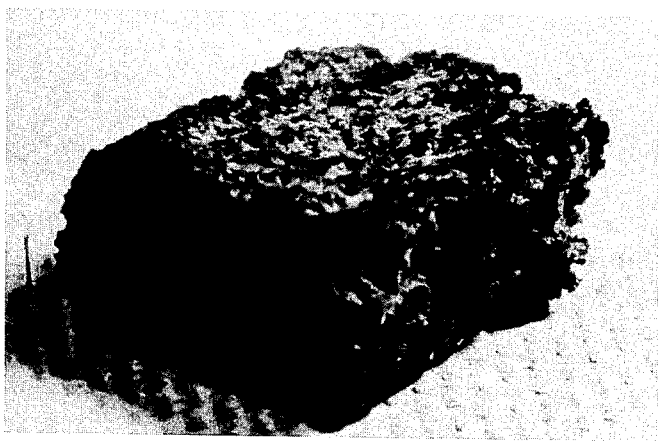

FIG. 1 is a photomicrograph depicting by about 2½ to 3X magnification a piece of compacted, defatted, dehulled soybean starting material of the type used in the present invention; and FIG. 2 is a photomicrograph depicting by 2½ to 3X magnification a piece of defatted, dehulled, compacted soybean material after treatment by the process of the present invention.

These photographs illustrate that the process of the present invention results in a swelling of the compacted essentially non-porous soybean material shown in FIG. 1 to produce the porous product illustrated in FIG. 2. As may be noted from an examination of FIG. 2, the final product contains a plurality of interstices or continuous cells which may be readily penetrated by heat and moisture in subsequent operations associated with preparation of foodstuffs, particularly conventional sterilization and/or canning methods. The porosity also permits the impregnation of the piece with other materials to produce a final consumer produce. It should be noted that in both photomicrographs the thin edge of the skin portion is apparent at the bottom edge of the piece. The swelling of the piece of FIG. 2 does not appreciably alter the size and shape of this skin and

EXAMPLE 7

In this example 320 grams of compacted soy product was placed in 1600 ml. of water containing ½% lactic acid (initial pH about 2.5). The water and compacted soy product was placed in an autoclave and heated at about 120°C. and at a pressure of about 15 psig. (saturated steam pressure) for a period of about 30 minutes. The autoclave was permitted to cool and the product recovered from the liquor (pH 4.4) and drained. The drained product recovered from the liquor had a moisture content of about 63 percent and, on a moisture-free basis, a protein content of about 65 percent. The moist product was seasoned, coated with a batter and fried in deep fat to produce a food product similar in shape to ravioli and, when eaten, had the texture and mouth feel of a meat product.

EXAMPLE 8

A Textrasoy compacted defatted, dehulled soybean product was placed in 800 ml. of a water solution containing ½% acetic acid (pH 2.8) and 5% propylene glycol. The mixture was subjected to 15 psig in an autoclave at about 120°C. for about 30 minutes. The product was recovered from the liquor, drained and then dried at 90°C. to a total volatile content of about 31.3 percent of which 6.85 percent was propylene glycol. On extended shelf storage in polyethylene bags, the product remained moist and free of mold or any evidence of bacterial decomposition. This product represents a typical moist dog food sold in packages which does not require sterilization for good shelf keeping qualities.

EXAMPLE 9

This example illustrates the results obtained by washing of the treated product after recovery from the liquor and draining. Products treated in ½% acetic acid solutions at 15 psig. (120°C.) for 30 minutes were washed with water and 95% ethanol. The following results were obtained:

|  | % Protein (Moisture Free) |
|---|---|
| Washed with Water | 64 |
| Washed with Alcohol | 68 |

The foregoing example illustrates that washing of the products obtained by treatment in accordance with the process of the present invention results in additional removal of non-proteinaceous solubles. Washing with ethanol is even more effective in removing the solubilized non-proteinaceous components as may be seen in the example wherein a protein content of 68 percent is achieved when calculated on a moisture-free basis. This, of course, may be contrasted with a normal protein content of 55 percent in the compacted soy product, again calculated on a moisture free basis.

The process of the present invention as may be understood from the foregoing example is broadly adapted to the production of food products high in protein content which have the structure and mouth feel of meat in the rehydrated or moist form. As pointed out previously, the dry products are quite porous and by virtue of this characteristic readily absorb moisture so that when wetted with water or other solutions such as aqueous solutions of fat or oils, spice oils, etc., they are rapidly converted to a form which may be consumed as a substitute meat-like product high in protein. Obviously there are many advantages to such a product in producing a relatively economical source of protein food. The product, when suitably colored to resemble cooked meat materials, may be utilized in preparing various meat simulating and meat-type products for human consumption such as, for example, chucks and other product shapes resembling meat either alone or when deep or batter fried, ground meat products such as, for example, an imitation hamburger, Mexican type foods such as tacos and the like, substituting in each instance the product of the present invention for meat in whole or in part. It has also been found that this product may be admixed with other meat proteins such as horse meat, beef trimmings, or the like and when suitably colored, is practically indistinguishable from the natural protein materials in the finally prepared form. A dog food utilizing the products of the present invention as a partial substitute for meat proteins has been prepared and had an appearance of an all-meat product.

One of the particular advantages of the process of this invention is that the protein efficiency ratio of the protein component is not appreciably altered by this processing and it provides a high efficiency food product at a relatively low cost. The porosity of the products, whether produced in a dry or moist form, permits rapid and efficient heat penetration to the center portions of these materials permitting normal can sterilization and cooking procedures. Such procedures cannot be followed using the compacted materials. Furthermore, it should be noted that the products of this invention are particularly free from typical beany flavors normally associated with seed meal derived materials.

What is claimed is:

1. A process for producing a proteinaceous food product having an enhanced protein content and the fibrous chewy texture of meat which comprises contacting a compacted, defatted protein-containing seed meal product in shard form which is characterized by the presence as one portion of the surface thereof of a densified, tough, at least partially denatured skin which is resistant to rehydration; with an aqueous solution having a pH of from about 2 to about 6.5 and containing a non-toxic, edible polyhydric alcohol having bacteriostatic properties, at temperatures above about 105°C. and at superatmospheric pressure for a time sufficient to solubilize and extract a portion of the non-proteinaceous component of said starting material and increase the relative protein content thereof and render the starting material substantially porous, recovering the product from the resulting liquor and reducing the moisture content of the product to from about 12 to about 50% by weight; said product containing an amount of polyhydric alcohol sufficient to render it resistant to bacterial attack when packaged without sterilization or canning.

2. The process according to claim 1 wherein the polyhydroxy alcohol is selected from the group consisting of propylene glycol, glycerol and butylene glycol.

3. A process according to claim 1 wherein the moisture content reduction is to between about 20 and about 50 percent.

4. The product of the process of claim 1.

* * * * *